US012641396B2

(12) United States Patent　　(10) Patent No.:　　US 12,641,396 B2
Godin et al.　　　　　　　　　　　(45) Date of Patent:　　May 26, 2026

(54) SMF-CENTRIC MBS ACTIVATION WITH GROUP PAGING

(71) Applicant: Nokia Technologies Oy, Espoo (FI)

(72) Inventors: Philippe Godin, Massy (FR); Horst Thomas Belling, Munich (DE); David Navrátil, Espoo (FI)

(73) Assignee: Nokia Technologies Oy, Espoo (FI)

( * ) Notice: Subject to any disclaimer, the term of this patent is extended or adjusted under 35 U.S.C. 154(b) by 319 days.

(21) Appl. No.: 18/260,086

(22) PCT Filed: Nov. 18, 2021

(86) PCT No.: PCT/FI2021/050780

§ 371 (c)(1),
(2) Date: Jun. 30, 2023

(87) PCT Pub. No.: WO2022/148897

PCT Pub. Date: Jul. 14, 2022

(65) Prior Publication Data

US 2024/0073649 A1　　Feb. 29, 2024

Related U.S. Application Data

(60) Provisional application No. 63/135,051, filed on Jan. 8, 2021.

(51) Int. Cl.
*H04W 4/06*　　　　　(2009.01)
*H04L 12/18*　　　　　(2006.01)
(Continued)

(52) U.S. Cl.
CPC ........... *H04W 4/06* (2013.01); *H04L 12/1886* (2013.01); *H04L 12/189* (2013.01); *H04L 65/611* (2022.05);
(Continued)

(58) Field of Classification Search
CPC ..... H04W 4/06; H04W 76/40; H04W 68/005; H04W 4/08; H04L 12/1886; H04L 12/189; H04L 65/611; H04L 67/145
See application file for complete search history.

(56) References Cited

U.S. PATENT DOCUMENTS

2020/0045753 A1　2/2020　Dao et al.
2020/0351984 A1　11/2020　Talebi Fard et al.

FOREIGN PATENT DOCUMENTS

| CN | 109548113 A | * | 3/2019 | ............ H04W 48/04 |
|----|----|----|----|----|
| WO | 2020/197454 A1 | | 10/2020 | |
| WO | WO-2020252795 A1 | * | 12/2020 | ............ H04W 48/18 |

OTHER PUBLICATIONS

Extended European Search Report received for corresponding European Patent Application No. 21917373.9, dated Aug. 22, 2024, 9 pages.

(Continued)

*Primary Examiner* — Mandish K Randhawa
(74) *Attorney, Agent, or Firm* — Harness, Dickey & Pierce, P.L.C.

(57) ABSTRACT

Network devices and a method for providing a session management function (SMF)-centric multicast and broadcast services (MBS) activation using group paging may include a SMF network device which is caused to receive a MBS activate message, the MBS activate message including a MBS session ID, determine a plurality of deactivated UE devices associated with the MBS session ID, the plurality of deactivated UE devices including idle UE devices, determine at least one AMF network device associated with each of the determined plurality of deactivated UE devices, and transmit an AMF MBS activate message to the AMF network device, the AMF MBS activate message including information related to at least one UE device associated with each of the determined at least one AMF network, the AMF (Continued)

MBS activate message causing the at least one AMF network device to trigger a group paging of the UE device.

17 Claims, 5 Drawing Sheets

(51) Int. Cl.

| | |
|---|---|
| H04L 65/611 | (2022.01) |
| H04L 67/145 | (2022.01) |
| H04W 4/08 | (2009.01) |
| H04W 68/00 | (2009.01) |
| H04W 76/40 | (2018.01) |

(52) U.S. Cl.
CPC ............. *H04L 67/145* (2013.01); *H04W 4/08* (2013.01); *H04W 68/005* (2013.01); *H04W 76/40* (2018.02)

(56) References Cited

OTHER PUBLICATIONS

"MBS Session Activation", 3GPP TSG-RAN WG3#111-e, R3-210164, Agenda: 22.2.1, Nokia, Jan. 25-Feb. 4, 2021, 4 pages.
"KI#1: Conclusion update for MBS Session activation/deactivation and UE join/leave", SA WG2 Meeting #143E, S2-2101017, Agenda: 8.9.1, Nokia, Feb. 24-Mar. 9, 2020, 21 pages.
"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"3rd Generation Partnership Project; Technical Specification Group Radio Access Network; NG-RAN; NG Application Protocol (NGAP) (Release 16)", 3GPP TS 38.413, V16.3.0, Sep. 2020, pp. 1-466.
"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.
"3rd Generation Partnership Project; Technical Specification Group Services and System Aspects; Procedures for the 5G System (5GS); Stage 2 (Release 16)", 3GPP TS 23.502, V16.6.0, Sep. 2020, pp. 1-597.
"KI#1: Conclusion on MBS Session deactivation and activation", SA WG2 Meeting #142E, S2-2009472, Agenda: 8.9, OPPO, Nov. 16-20, 2020, pp. 1-4.
"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
"3rd Generation Partnership Project; Technical Specification Group Services and System Aspects; Architectural enhancements for 5G multicast-broadcast services; Stage 2 (Release 17)", 3GPP TS 23.247, V17.4.0, Sep. 2022, pp. 1-113.
"MBS Session Activation", 3GPP TSG-RAN WG3#111, R3-21xxxx, Agenda: 22.2.1, Nokia, Jan. 2021, pp. 1-4.
International Search Report and Written Opinion received for corresponding Patent Cooperation Treaty Application No. PCT/FI2021/050780, dated Feb. 15, 2022, 17 pages.
"3rd Generation Partnership Project; Technical Specification Group Services and System Aspects; Study on architectural enhancements for 5G multicast-broadcast services (Release 17)", 3GPP TR 23.757, V1.2.0, Nov. 2020, pp. 1-293.

* cited by examiner

SMF-CENTRIC MBS ACTIVATION WITH GROUP PAGING

RELATED APPLICATION

This application was originally filed as PCT Application No. PCT/FI2021/050780 on Nov. 18, 2021, which claims priority from U.S. Provisional Application No. 63/135,051, filed on Jan. 8, 2021, both of which are incorporated herein by reference in their entirety.

BACKGROUND

Field

Various example embodiments relate to methods, apparatuses, systems, and/or non-transitory computer readable media for providing a session management function (SMF)-centric multicast and broadcast services (MBS) activation using group paging for user equipment (UE) devices.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard. One of the advantages of the 5G standard is to allow the implementation of multicast and broadcast services (MBS) sessions while reusing the 4G evolved packet system (EPS) architecture and nodes. The current 5G standard implementation of MBS sessions allows for individual MBS sessions to be deactivated (e.g., suspended, etc.) and/or activated (e.g., active, etc.) by an Application Function (AF) network element and/or by a multicast/broadcast user plane function (MB-UPF) network element, in order to reduce network resource usage, etc. For example, an AF network element may transmit a trigger to the 5G core network which causes at least one MBS session to become deactivated and/or activated. As another example, a MB-UPF network element may transmit a trigger to the 5G core network which causes at least one MBS session to become deactivated in response to the MB-UPF not detecting any multicast data for a desired period of time, or transmit a trigger to activate a MBS session in response to the detection of multicast data on the network.

Additionally, the current 5G standard allows for a radio access network (RAN) node to change an operating state of at least one user equipment (UE) device corresponding to a deactivated MBS session by changing the UE device to an idle state and/or deactivated state (e.g., the RAN node moves the UE device to an RRC inactive mode and/or an RRC idle mode, etc.).

However, the current 5G standard does not define the network signaling necessary to activate a UE device which is in the idle and/or deactivated state when an MBS session has been re-activated (e.g., resumed, etc.).

Therefore, it is a desired goal to provide an efficient method for providing network signaling to deactivated UE devices (e.g., UE devices in an idle mode, etc.) subscribed to a particular MBS session when the MBS session is reactivated, by reducing the amount of signaling overhead.

SUMMARY

At least one example embodiment relates to a session management function (SMF) network device.

La In at least one example embodiment, the SMF network device may include a memory storing computer readable instructions, and processing circuitry configured to execute the computer readable instructions to cause the SMF network device to receive a multicast and broadcast service (MBS) activate message, the MBS activate message including a MBS session identifier (ID), determine a plurality of deactivated user equipment (UE) devices associated with the MBS session ID, determine at least one access and mobility management function (AMF) network device associated with each of the determined plurality of deactivated UE devices, and transmit an AMF MBS activate message to the determined at least one AMF network device, the AMF MBS activate message including information related to at least one UE device of the plurality of deactivated UE devices associated with each of the determined at least one AMF network, the AMF MBS activate message causing the at least one AMF network device to trigger a group paging of the at least one UE device.

LE Some example embodiments provide that the SMF network device is further caused to receive a protocol data unit (PDU) session update message from the determined at least one AMF network device corresponding to the at least one UE device, and transmit a PDU session request message to at least one radio access network (RAN) node associated with the at least one UE device.

Some example embodiments provide that the SMF network device is further caused to determine the plurality of deactivated UE devices based on MBS session status information corresponding to the respective UE devices stored in the memory.

Some example embodiments provide that the SMF network device is further caused to determine the plurality of deactivated UE devices based on PDU session status information corresponding to the respective UE device stored in the memory.

Some example embodiments provide that the PDU session status information corresponding to the respective UE device indicates that the PDU session associated with the received MBS session ID is deactivated.

Some example embodiments provide that the AMF MBS activate message further includes at least one of the MBS session ID and a group ID indicating a paging group associated with the MBS session.

At least one example embodiment relates to an access and mobility management function (AMF) network device.

In at least one example embodiment, the AMF network device may include a memory storing computer readable instructions, and processing circuitry configured to execute the computer readable instructions to cause the AMF network device to receive a first AMF multicast and broadcast service (MBS) activate message from at least one session management function (SMF) network device, the first AMF MBS activate message including information related to at least one first user equipment (UE) device of a plurality of deactivated UE devices, determine a first MBS group paging area based on the information related to the at least one first UE device, and transmit a first group paging message to at least one first radio access network (RAN) node associated with the first MBS group paging area.

Some example embodiments provide that the AMF network device is further caused to determine the first MBS group paging area by determining at least one first registration area associated with the at least one UE device, determine the at least one first RAN node associated with the at least one first MBS group paging area, and transmit the first group paging message by transmitting the first group paging message to the determined at least one first RAN node associated with the at least one first MBS group paging area.

Some example embodiments provide that the at least one first UE device is a plurality of first UE devices, and the AMF network device is further caused to determine a plurality of first registration areas, each of the plurality of first registration areas associated with one of the plurality of first UE devices, determine the first MBS group paging area based on a combination of the determined plurality of first registrations areas, determine a plurality of first RAN nodes associated with the first MBS group paging area, and transmit the first group paging message to each of the determined plurality of first RAN nodes.

Some example embodiments provide that the AMF network device is further caused to perform the transmitting the first group paging message by determining a number of UE devices indicated in the first AMF MBS activate message, and transmitting the first group paging message in response to the number of UE devices exceeding a desired threshold number of UE devices.

Some example embodiments provide that the AMF network device is further caused to perform the transmitting the first group paging message by transmitting the first group paging message in response to an expiration of a desired length of time.

Some example embodiments provide that the AMF network device is further caused to receive a second AMF MBS activate message from the at least one second SMF network device, the second AMF MBS activate message including information related to at least one second UE device of a plurality of second deactivated UE devices, determine a second MBS group paging area based on the information related to the at least one second UE device, the determining the second MBS group paging area including, determining a plurality of second registration areas associated with any one of the plurality of second deactivated UE devices, each of the plurality of second registration areas including at least one second tracking area, and determining the second MBS group paging area based on the determined plurality of second registration areas, and transmit a second group paging message to at least one second radio access network (RAN) node associated with the second MBS group paging area.

Some example embodiments provide that the AMF network device is further caused to determine whether any second tracking area of any second registration area of the plurality of second registration areas were included in the plurality of first registration areas, update the second MBS group paging area by removing the second tracking areas determined to be included in the plurality of first registration areas from the second MBS group paging area, and transmit the second group paging message to the at least one second RAN node associated with the updated second MBS group paging area.

Some example embodiments provide that the AMF network device is further caused to determine whether any second RAN node previously transmitted the first group paging message during a desired time period, update the second MBS group paging area by removing second tracking areas corresponding to the second RAN nodes determined to have previously transmitted the first group paging message from the second MBS group paging area, and transmit the second group paging message to the at least one second RAN node associated with the updated second MBS group paging area.

Some example embodiments provide that the AMF network device is further caused to receive a protocol data unit (PDU) session update message from the at least one first UE device in response to the first group paging message, and transmit the PDU session update message to the at least one SMF network device.

Some example embodiments provide that the AMF MBS activate message further includes at least one of the MBS session ID and a group ID indicating a paging group associated with the MBS session ID.

Some example embodiments provide that the group ID is included in the first or second group paging message to the at least one RAN node associated with the MBS group paging area.

At least one example embodiment relates a method of operating a session management function (SMF) network device.

In at least one example embodiment, the method may include receiving a multicast and broadcast service (MBS) activate message, the MBS activate message including a MBS session identifier (ID), determining a plurality of deactivated user equipment (UE) devices associated with the MBS session ID, determining at least one access and mobility management function (AMF) network device associated with each of the determined plurality of deactivated UE devices, and transmitting an AMF MBS activate message to the determined at least one AMF network device, the AMF MBS activate message including information related to at least one UE device of the plurality of deactivated UE devices associated with each of the determined at least one AMF network, the AMF MBS activate message causing the at least one AMF network device to trigger a group paging of the at least one UE device.

Some example embodiments provide that the method may further include determining the plurality of deactivated UE devices based on MBS session status information corresponding to the respective UE devices stored in memory of the SMF network device.

Some example embodiments provide that the method may further include determining the plurality of deactivated UE devices based on protocol data unit (PDU) session status information corresponding to the respective UE device stored in memory of the SMF network device.

Some example embodiments provide that the PDU session status information corresponding to the respective UE device indicates that the PDU session associated with the received MBS session ID is deactivated.

Some example embodiments provide that the AMF MBS activate message further includes one of at least one of the MBS session ID and a group ID indicating a paging group associated with the MBS session.

At least one example embodiment relates to a session management function (SMF) network device.

In at least one example embodiment, the SMF network device may include receiving means arranged to receive a multicast and broadcast service (MBS) activate message, the MBS activate message including a MBS session identifier (ID), determining means arranged to determine a plurality of deactivated user equipment (UE) devices associated with the MBS session ID, and determine at least one access and mobility management function (AMF) network device associated with each of the determined plurality of deactivated UE devices, and transmitting means arranged to transmit an AMF MBS activate message to the determined at least one AMF network device, the AMF MBS activate message including information related to at least one UE device of the plurality of deactivated UE devices associated with each of the determined at least one AMF network, the AMF MBS activate message causing the at least one AMF network device to trigger a group paging of the at least one UE device.

Some example embodiments provide that the receiving means is further arranged to receive a protocol data unit (PDU) session update message from the determined at least one AMF network device corresponding to the at least one UE device, and the transmitting means is further arranged to transmit a PDU session request message to at least one radio access network (RAN) node associated with the at least one UE device.

Some example embodiments provide that the determining means is further arranged to determine the plurality of deactivated UE devices based on MBS session status information corresponding to the respective UE devices stored in the memory.

Some example embodiments provide that the determining means is further arranged to determine the plurality of deactivated UE devices based on PDU session status information corresponding to the respective UE device stored in the memory.

Some example embodiments provide that the PDU session status information corresponding to the respective UE device indicates that the PDU session associated with the received MBS session ID is deactivated.

Some example embodiments provide that the AMF MBS activate message further includes at least one of the MBS session ID and a group ID indicating a paging group associated with the MBS session.

At least one example embodiment relates to an access and mobility management function (AMF) network device.

In at least one example embodiment, the AMF network device may include receiving means arranged to receive a first AMF multicast and broadcast service (MBS) activate message from at least one session management function (SMF) network device, the first AMF MBS activate message including information related to at least one first user equipment (UE) device of a plurality of deactivated UE devices, determining means arranged to determine a first MBS group paging area based on the information related to the at least one first UE device, and transmitting means arranged to transmit a first group paging message to at least one first radio access network (RAN) node associated with the first MBS group paging area.

Some example embodiments provide that the determining means is further arranged to determine the first MBS group paging area by determining at least one first registration area associated with the at least one UE device, and determine the at least one first RAN node associated with the at least one first MBS group paging area, and the transmitting means is further arranged to transmit the first group paging message by transmitting the first group paging message to the determined at least one first RAN node associated with the at least one first MBS group paging area.

Some example embodiments provide that the at least one first UE device is a plurality of first UE devices, and the determining means is further arranged to determine a plurality of first registration areas, each of the plurality of first registration areas associated with one of the plurality of first UE devices, determine the first MBS group paging area based on a combination of the determined plurality of first registrations areas, and determine a plurality of first RAN nodes associated with the first MBS group paging area, and the transmitting means is further arranged to transmit the first group paging message to each of the determined plurality of first RAN nodes.

Some example embodiments provide that the determining means is further arranged to determine a number of UE devices indicated in the first AMF MBS activate message, and the transmitting means is further arranged to transmit the first group paging message in response to the number of UE devices exceeding a desired threshold number of UE devices.

Some example embodiments provide that the transmitting means is further arranged to transmit the first group paging message in response to an expiration of a desired length of time.

Some example embodiments provide that the receiving means is further arranged to receive a second AMF MBS activate message from the at least one second SMF network device, the second AMF MBS activate message including information related to at least one second UE device of a plurality of second deactivated UE devices, the determining means is further arranged to determine a second MBS group paging area based on the information related to the at least one second UE device, the determining the second MBS group paging area including, determining a plurality of second registration areas associated with any one of the plurality of second deactivated UE devices, each of the plurality of second registration areas including at least one second tracking area, and determining the second MBS group paging area based on the determined plurality of second registration areas, and the transmitting means is further arranged to transmit a second group paging message to at least one second radio access network (RAN) node associated with the second MBS group paging area.

Some example embodiments provide that the determining means is further arranged to determine whether any second tracking area of any second registration area of the plurality of second registration areas were included in the plurality of first registration areas, and update the second MBS group paging area by removing the second tracking areas determined to be included in the plurality of first registration areas from the second MBS group paging area, and the transmitting means is further arranged to transmit the second group paging message to the at least one second RAN node associated with the updated second MBS group paging area.

Some example embodiments provide that the determining means is further arranged to determine whether any second RAN node previously transmitted the first group paging message during a desired time period, and update the second MBS group paging area by removing second tracking areas corresponding to the second RAN nodes determined to have previously transmitted the first group paging message from the second MBS group paging area, and the transmitting means is further arranged to transmit the second group paging message to the at least one second RAN node associated with the updated second MBS group paging area.

Some example embodiments provide that the receiving means is further arranged to receive a protocol data unit (PDU) session update message from the at least one first UE device in response to the first group paging message, and the transmitting means is further arranged to transmit the PDU session update message to the at least one SMF network device.

Some example embodiments provide that the AMF MBS activate message further includes at least one of the MBS session ID and a group ID indicating a paging group associated with the MBS session ID.

Some example embodiments provide that the group ID is included in the first or second group paging message to the at least one RAN node associated with the MBS group paging area.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
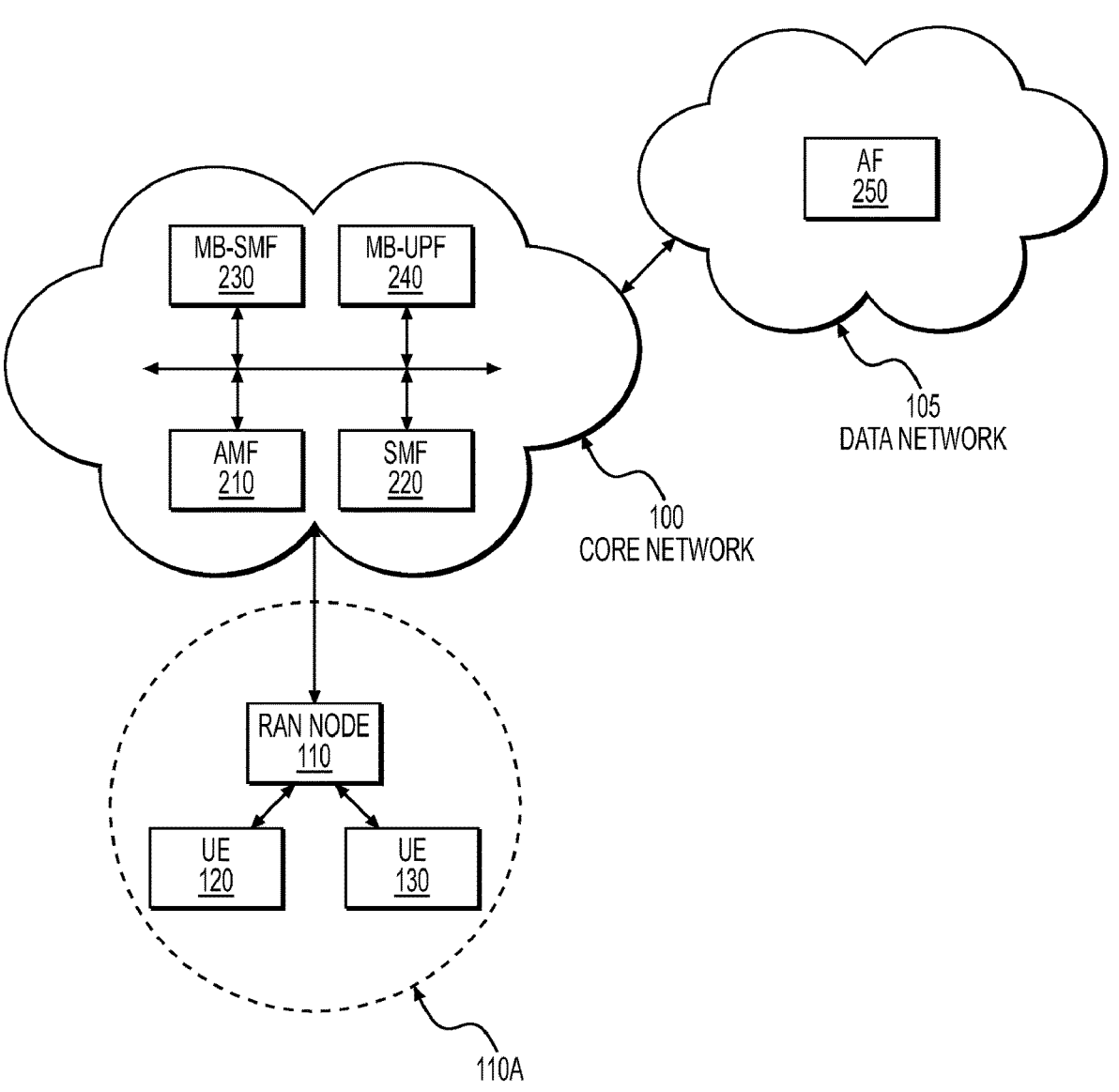
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

FIG. 1 illustrates a wireless communication system according to at least one example embodiment. As shown in FIG. 1, a wireless communication system includes a core network 100, a Data Network 105, a first radio access network (RAN) node 110, a first user equipment (UE) device 120, and a second UE device 130, but the example embodiments are not limited thereto and the example embodiments may include a greater or lesser number of constituent elements. For example, the wireless communication system may include a single UE device, three or more UE devices, two or more RAN nodes, etc.

The RAN node 110 and/or the UE devices 120 and 130 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network 100 and/or a Data Network (DN) 105. The RAN node 110 may connect to each other and/or other RAN nodes (not shown), as well as to the core network 100, over a wired and/or wireless network. The core network 100 and the DN 105 may connect to each other over a wired and/or wireless network. The DN 105 may refer to the Internet, an intranet, a wide area network, a local area network, a cloud network, a distributed network, etc.

The UE device 130 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE device 130 may be configurable to transmit and/or receive data in accordance to strict latency, reliability, and/or accuracy requirements, such as URLLC communications, TSC communications, etc., but the example embodiments are not limited thereto.

The wireless communication system further includes at least one RAN node (e.g., a base station, a wireless access point, etc.), such as RAN node 110, etc. The RAN node 110 may operate according to an underlying cellular and/or wireless radio access technology (RAT), such as 5G NR, LTE, Wi-Fi, etc. For example, the RAN node 110 may be a 5G gNB node, a LTE eNB node, or a 5G ng-eNB node, etc., but the example embodiments are not limited thereto. The RAN node 110 may provide wireless network services to one or more UE devices within a cell service area (e.g., a broadcast area, a serving area, a coverage area, etc.) surrounding the respective physical location of the RAN node, such as a cell service area 110A surrounding the RAN node 110, etc. For example, UE devices 120 and 130 are located within the cell service area 110A, and may connect to, receive multicast messages from, receive broadcast messages from, receive paging messages from, receive/transmit signaling messages from/to, and/or access the wireless network through, etc., RAN node 110 (e.g., the RAN node serving the UE devices 120 and 130), but the example embodiments are not limited thereto.

According to at least one example embodiment, the UE devices 120 and/or 130 may subscribe to and/or be subscribed to one or more MBS sessions associated with the core network 100 and/or the DN 105, etc.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF) 210, a session management function (SMF) 220, a multicast/broadcast session management function (MB-SMF) 230, a multicast/broadcast user plane function (MB-UPF) 240, etc., but the example embodiments are not limited thereto. According to some example embodiments, the core network 100 may further include a policy control function (PCF), a unified data management (UDM), a user plane function (UPF), an authentication server function (AUSF), an application function (AF), and/or a network slice selection function (NSSF), etc., but the example embodiments are not limited thereto.

According to at least one example embodiment, the AMF 210 may be configured to receive all connection and session information from UE devices and/or RAN nodes, and to handle connection and mobility management tasks, and forwarding session management tasks of one or more UE devices to one or more SMFs, such as SMF 220, assigned to the one or more UE devices. For example, the AMF 210 may provide functions and capabilities relating to control plane operations associated with the UE devise and/or RAN nodes, such as security of the wireless network, access management, authorization of UE devices, etc. The AMF 210 may transmit signaling traffic (e.g., signaling messages, control packets, etc.) to and/or from network equipment, such as RAN nodes, BSs, routers, switches, etc., to which the AMF 210 has established a control plane connection.

Examples of signaling traffic may include paging messages, public warning messages, overload messages, etc.

According to at least one example embodiment, the SMF 220 may be configured to manage data and/or communication sessions associated with individual UE devices, such as UE 120, 130, such as adding, modifying, and/or deleting Protocol Data Unit (PDU) sessions, and/or managing session contexts with a UPF, etc., associated with the UE devices. For example, the SMF 220 may store PDU session state information (e.g., whether the PDU session is active, idle, inactive and/or deactivated, etc.) for each PDU session associated with each UE device assigned to the SMF 220 by the AMF 210, etc., but the example embodiments are not limited thereto.

According to at least one example embodiment, the MB-SMF 230 may be configured to control MBS sessions, including MBS message transport and/or MBS quality of service (QoS) based on MBS policies received from a PCF, etc., but the example embodiments are not limited thereto.

According to at least one example embodiment, the MB-UPF 240 may be configured to provide support for packet filtering of MBS flows and delivery of MBS flows to RAN nodes, replicate MBS data packets destined for different RAN nodes, provide MBS QoS enforcement, etc., but the example embodiments are not limited thereto.

Additionally, the data network 105 may include at least one AF 250, but is not limited thereto. The AF 250 may connect to and request the services of a network exposure function (NEF) which may be a controller (e.g., a quality of service controller and/or network charging services) for applications on the DN 105, etc., but is not limited thereto.

Additionally, according to some example embodiments, the AF 250 may reside on the core network 100, and/or there may be a plurality of AF 250s residing on both the core network 100 and DN 105, etc.

Each of the network elements of the core network 100 and/or data network 105, including AMF 210, SMF 220, MB-SMF 230, MB-UPF 240, and AF 250, may be embodied as a server, a processing device, a node, a router, a network device, etc. Additionally, one or more of the core network elements may be combined into one or more servers, processing devices, nodes, routers, network devices, etc. For example, the AMF 210 and SMF 220, etc., may be incorporated into a single core network server, etc. The AMF 210, SMF 220, MB-SMF 230, MB-UPF 240, and AF 250 will be discussed in greater detail in connection with FIGS. 4 to 5.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
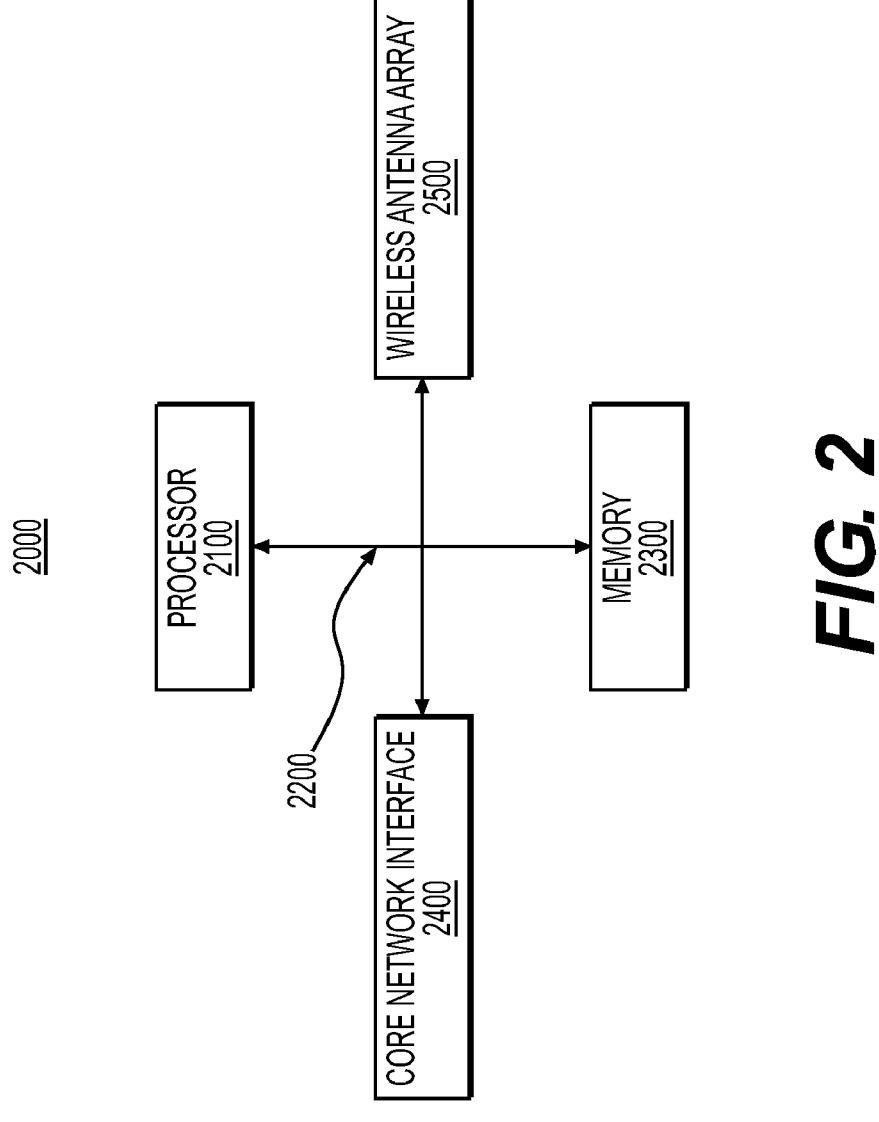
FIG. 2 illustrates a block diagram of an example RAN node according to at least one example embodiment.

FIG. 2 illustrates a block diagram of an example RAN node according to at least one example embodiment. The RAN node may correspond to the RAN node 110 of FIG. 1, but is not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIG. 5, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule resource blocks (e.g., physical resource blocks (PRBs), resource elements, etc.) for UE devices connected to the RAN node 2000.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 will allocate a carrier (or subbands of the carrier) to one or more UEs (e.g., UE 120, UE 130, etc.) connected to the RAN node 2000 during designated upload (e.g., uplink (UL)) time periods and designated download (e.g., downlink (DL)) time periods. When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time slot (e.g., one OFDM symbol, one slot, one minislot, one subframe, etc.) and/or a specific downlink/uplink resource block (e.g., twelve adjacent subcarriers, a frequency subband, etc.).

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 120, UE 130, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network 100 (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as AMF 210, SMF 220, MB-SMF 230, MB-UPF 240, and/or AF 250, etc., a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated.

Figure 3:
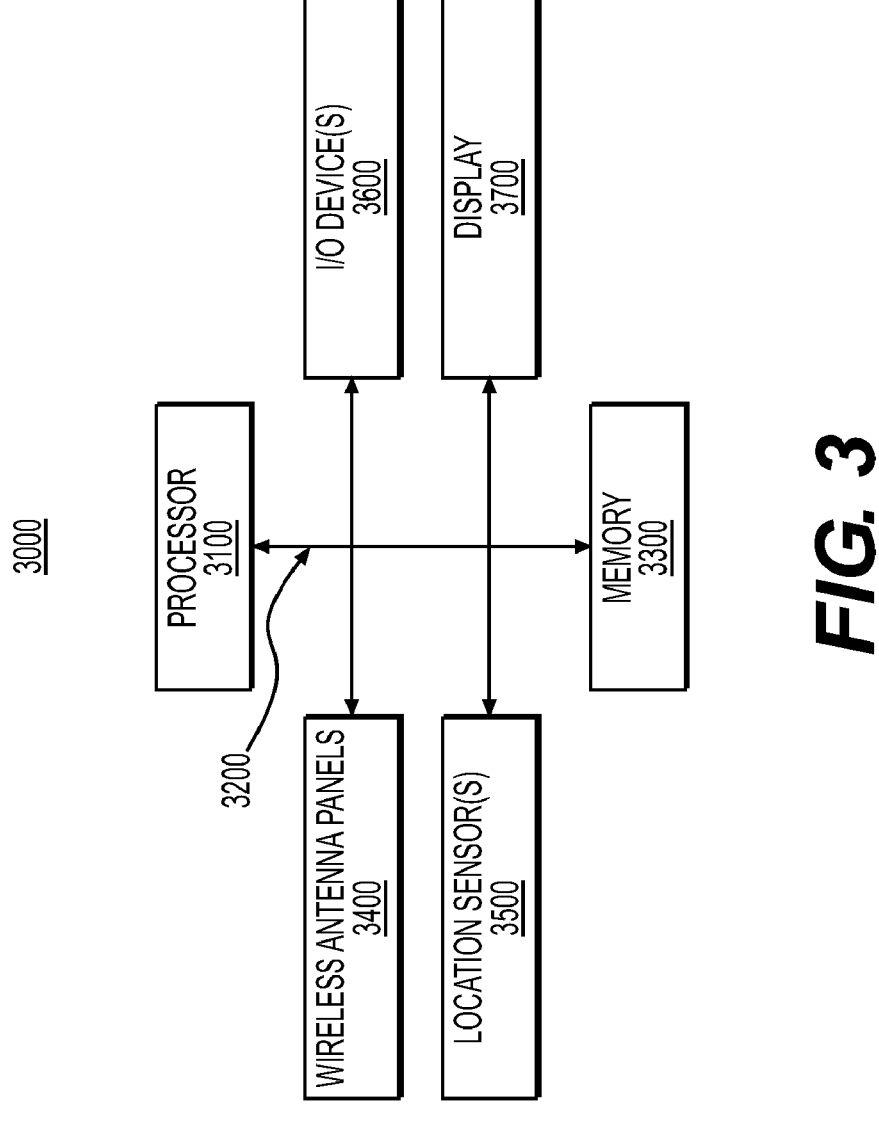
FIG. 3 illustrates a block diagram of an example UE device according to at least one example embodiment.

FIG. 3 illustrates a block diagram of an example UE device according to at least one example embodiment. The example UE device of FIG. 3 may correspond to the UE devices 120 and/or 130 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include a battery, one or more additional sensors (e.g., thermometers, humidity sensors, pressure sensors, motion sensors, accelerometers, etc.), actuators, a single wireless antenna and/or a single wireless antenna panel, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIG. 5, the wireless antenna 3400, and/or the location sensor 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, etc., for communicating with at least on RAN node, e.g., RAN node 110, etc., accessing a wireless network, etc., but the example embodiments are not limited thereto.

In at least one example embodiment, the at least one communication bus 3200 may enable communication and data transmission to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include a plurality of wireless antenna panels 3400 (e.g., a plurality of wireless antennas, etc.). The plurality of wireless antenna panels 3400 may include a plurality of associated radio units (not shown) and may be used to transmit wireless signals in accordance with at least one desired radio access technology, such as 4G LTE, 5G NR, Wi-Fi, etc. The plurality of wireless antenna panels 3400 may be located at the same or different physical locations on the body of the UE 3000, may have the same or different orientations, may operate in the same or different frequency ranges, may operate in accordance with the same or different radio access technology, etc. The UE 300 may use beamforming and/or beamsteering techniques with the plurality of wireless antenna panels 3400 to generate one or more beams (e.g., wireless radio channels, datastreams, streams, APs, etc.) and transmit and/or receive on each of the beams. According to some example embodiments, the plurality of wireless antenna panels 3400 may be a single antenna, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the UE 3000.

While FIG. 3 depicts an example embodiment of a UE 3000, the UE device is not limited thereto, and may include additional and/or alternative architectures that may be suitable for the purposes demonstrated.

Figure 4:
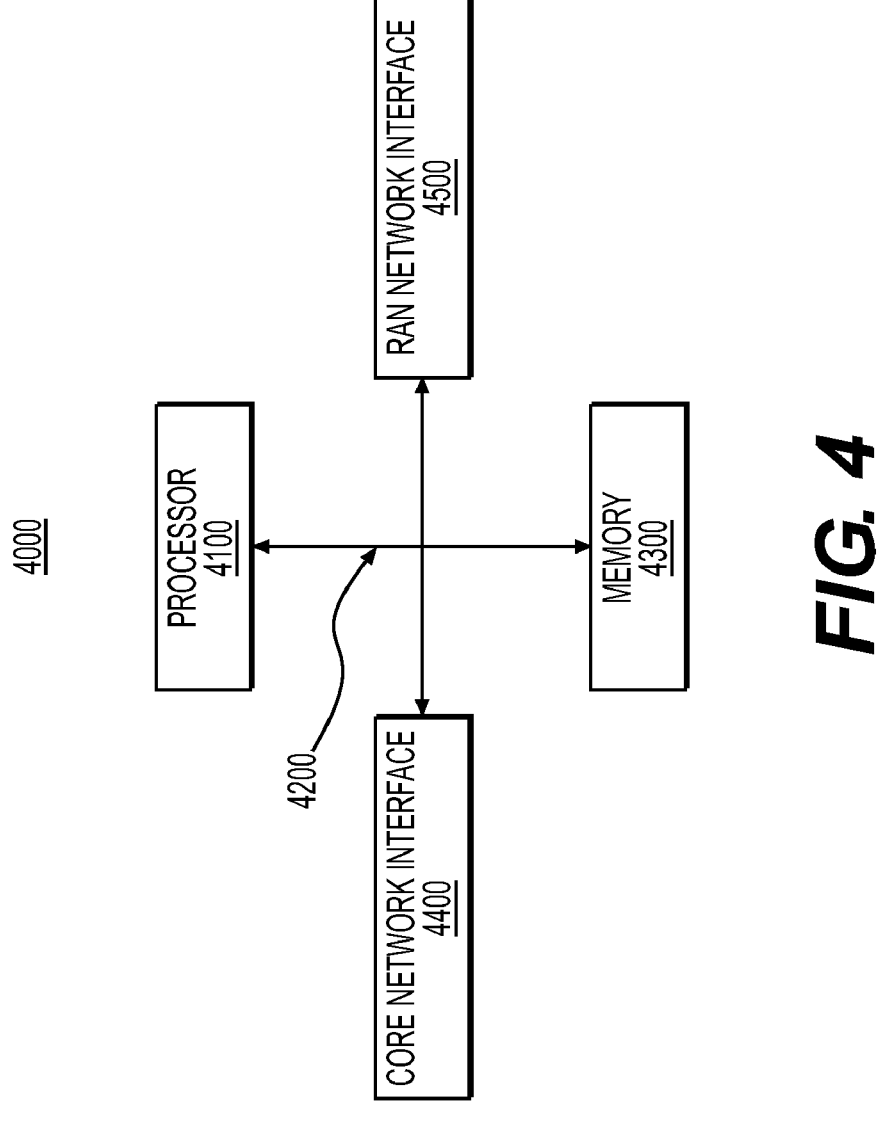
FIG. 4 illustrates a block diagram of an example core network device according to at least one example embodiment.

FIG. 4 illustrates a block diagram of an example core network device according to at least one example embodiment. The core network device may be a network function (NF) device, such as AMF 210, SMF, 220, MB-SMF 230, MB-UPF 240, and/or AF 250 of FIG. 1, etc., but the example embodiments are not limited thereto.

Referring to FIG. 4, a core network device 4000 (e.g., a network device, a network element, a network server, etc.) may include processing circuitry, such as the at least one processor 4100, a communication bus 4200, a memory 4300, at least one core network interface 4400, and/or at least one radio access network (RAN) network interface 4500, but the example embodiments are not limited thereto. For example, the core network interface 4400 and the RAN network interface 4500 may be combined into a single network interface, etc. The memory 4300 may include various program code including computer executable instructions.

In at least one example embodiment, the processing circuitry may include at least one processor (and/or processor cores, distributed processors, networked processors, etc.), such as the at least one processor 4100, which may be configured to control one or more elements of the core network device 4000, and thereby cause the core network device 4000 to perform various operations. The processing circuitry (e.g., the at least one processor 4100, etc.) is configured to execute processes by retrieving program code (e.g., computer readable instructions) and data from the memory 4300 to process them, thereby executing special purpose control and functions of the entire core network device 4000. Once the special purpose program instructions are loaded into, (e.g., the at least one processor 4100, etc.), the at least one processor 4100 executes the special purpose program instructions, thereby transforming the at least one processor 4100 into a special purpose processor.

In at least one example embodiment, the memory 4300 may be a non-transitory computer-readable storage medium and may include a random access memory (RAM), a read only memory (ROM), and/or a permanent mass storage device such as a disk drive, or a solid state drive. Stored in the memory 4300 is program code (i.e., computer readable instructions) related to operating the core network device 4000, such as the methods discussed in connection with FIG. 5, the at least one core network interface 4400, and/or at least one RAN network interface 4500, etc. Such software elements may be loaded from a non-transitory computer-readable storage medium independent of the memory 4300, using a drive mechanism (not shown) connected to the core network device 4000, or via the at least one core network interface 4400, and/or at least one RAN network interface 4500, etc.

In at least one example embodiment, the communication bus 4200 may enable communication and data transmission to be performed between elements of the core network device 4000. The bus 4200 may be implemented using a high-speed serial bus, a parallel bus, and/or any other appropriate communication technology.

The core network device 4000 may also include at least one core network interface 4400, and/or at least one RAN network interface 4500, etc. The at least one RAN network interface 4500 may include an associated radio unit (not shown) and may be used to transmit the wireless signals in accordance with a wireless communication protocol, such as 4G LTE wireless signals, 5G NR wireless signals, 6G wireless signals, 7G wireless signals, etc., to at least one RAN node, such as RAN node 110, and/or to at least one UE device, such as UE 120 and/or UE 130, etc. According to some example embodiments, the RAN network interface 4500 may be a single antenna, or may be a plurality of antennas, etc. In at least one example embodiment, the RAN network interface 4500 may also include a wired network interface.

The core network device 4000 may communicate with a core network (e.g., backend network, backbone network, Data Network, etc.) of the wireless communication network via a core network interface 4400. The core network interface 4400 may be a wired and/or wireless network interface and may enable the core network device 4000 to communicate and/or transmit data to and from to network devices on the backend network, such as a core network gateway (not shown), a Data Network gateway (not shown), etc.

While FIG. 4 depicts an example embodiment of a core network device 4000, the core network device is not limited thereto, and may include additional and/or alternative architectures that may be suitable for the purposes demonstrated.

Figure 5:
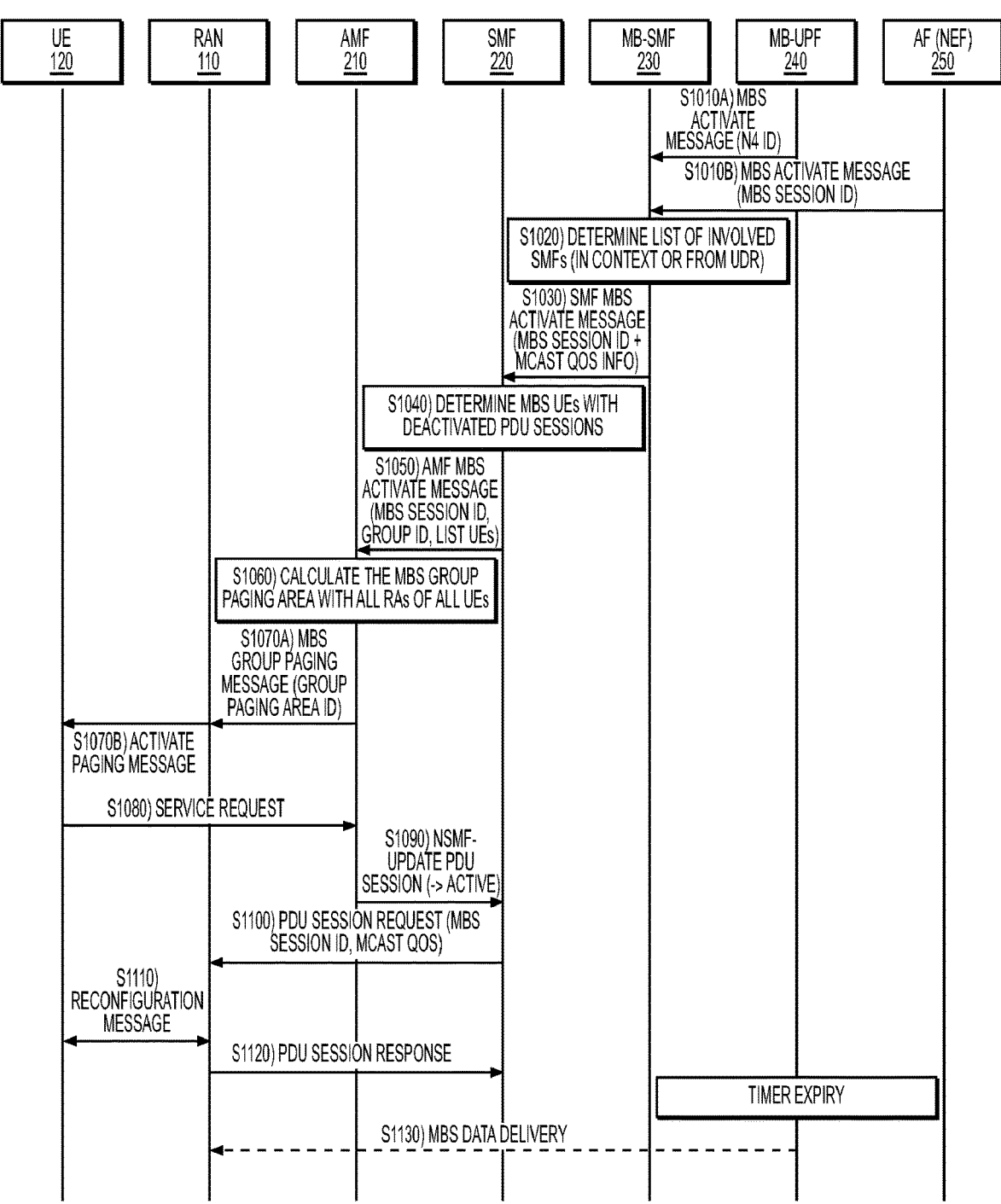
FIG. 5 illustrates an example transmission flow diagram according to at least one example embodiment.

FIG. 5 illustrates an example transmission flow diagram according to at least one example embodiment.

Referring now to FIG. 5, according to at least one example embodiment, at least one network device, such as AMF 210, SMF 220, MB-SMF 230, MB-UPF 240, AF 250, RAN node 110, and/or UE 120, etc., may perform methods of determining the identities of UE devices associated with a MBS group area in order to reduce, limit and/or minimize the signaling overhead for activating UE devices in an idle and/or deactivated state in response to a change in the MBS session state. However, the example embodiments are not limited thereto, and there may be a greater or lesser number of constituent elements performing one or more operations of the methods associated with FIG. 5. For example, while only a single UE, RAN node, AMF, SMF, MB-SMF, MB-UPF, and AF, are illustrated in FIG. 5, the example embodiments are not limited thereto, and there may be a plurality of UEs, a plurality of RAN nodes, a plurality of AMFs, a plurality of SMFs, a plurality of MB-SMFs, a plurality of MB-UPFs, and/or a plurality of AFs, or any combinations thereof.

More specifically, in one or more example embodiments, MB-SMF 230 receives a first MBS activate message from MB-UPF 240 (operation S1010A) and/or from AF 250 (operation S1010B), but is not limited thereto. The first MBS activate message may include MBS session identifier information (e.g., a MBS session identifier and/or an N4 identifier) which indicates that a MBS session has been activated (and/or reactivated, resumed, etc.), etc., but is not limited thereto. In operation S1020, the MB-SMF 230 may determine a list of SMFs associated with and/or involved with the MBS session being activated (e.g., reactivated, resumed, etc.). The list of SMFs associated with the MBS session may be determined by the MB-SMF 230 from information regarding SMFs, such as the SMF 220, which have previously registered with the MB-SMF 230 for notification regarding the MBS session status changes, and the MB-SMF 230 may store information related to the requesting SMF in its memory. Additionally, the list of SMFs may be stored in a remote database, e.g., from a unified data repository (UDR) network device, etc., and the MB-SMF 230 may determine the list of all SMFs involved with, assigned to, corresponding to, and/or associated with the MBS session by querying the remote database.

In operation S1030, the MB-SMF 230 may transmit a second MBS activate message (e.g., forward the first MBS activate message, etc.) to each of the SMFs included in the list of SMFs associated with the MBS session being activated (e.g., the at least one SMF associated with the UEs subscribed to the MBS session, etc.), e.g., SMF 220, etc., but not limited thereto. For example, there may be a plurality of UE devices associated with the MBS session being activated, and each of the plurality of UE devices may be associated with one or more SMFs, etc. The second MBS activate message may include at least one of the MBS session identifier information, multicast quality of service (QoS) information associated with the MBS session, etc., but is not limited thereto.

According to at least one example embodiment, in operation S1040, the SMF 220 may determine and/or identify a list of deactivated UEs that are subscribed to and/or associated with the MBS session. More specifically, the SMF 220 may determine a list of all PDU sessions associated with the MBS session based on the MBS session identifier information and PDU session context information for all of the UEs being managed by the SMF 220 which is stored in the memory of the SMF 220. The SMF 220 may then analyze the PDU session status information of all of the PDU sessions identified to be associated with the MBS session to determine whether any of the PDU session status information indicates that the PDU session is in the inactive and/or deactivated state. For each of the PDU sessions in the inactive and/or deactivated state, the SMF 220 identifies (e.g., looks up, determines, etc.) the UE device associated with this PDU session and compiles a list, or in other words, the SMF 220 determines and/or identifies a list of deactivated UE devices (e.g., deactivated and/or idle UE devices, hereinafter referred to collectively as deactivated UE devices) based on the MBS session identifier information and the PDU session status information, etc. Additionally, the SMF 220 may determine one or more AMFs associated with each of the determined and/or identified deactivated UE devices.

In operation S1050, the SMF 220 may transmit an activate message (e.g., an AMF MBS activate message, a MBS-related activate message, etc.) to each of the determined and/or identified AMFs, e.g., AMF 210, etc., and the activate message may include at least one of the MBS session identifier information, a group paging identifier associated with and/or indicating a previously established paging group associated with the MBS session, a list of deactivated UEs associated with the receiving AMF, etc., or any combinations thereof. For example, the activate message may include the group paging identifier if the group paging identifier is different than the MBS session identifier, etc., but is not limited thereto.

According to at least one example embodiment, in operation S1060, the AMF 210 may determine and/or calculate a group paging area for the deactivated UEs (e.g., calculate a MBS group paging area, etc.) based on the information included in the AMF MBS activate message. For example, the AMF 210 may calculate the MBS group paging area by determining and/or identify one or more registration areas (RA) associated with each of the deactivated UEs identified in the AMF MBS activate message based on RA context information for every UE associated with, involved with, assigned to, and/or corresponding to the AMF 210, etc. According to some example embodiments, the RA context information is stored in the memory of the AMF 210 and/or is obtained from the core network 100, etc.

The AMF 210 may then aggregate (e.g., combine, perform a union, join, add, sum, filter, etc.) each set of RAs associated with each of the deactivated UEs corresponding to the AMF 210 into a single set (e.g., a single list), etc. Each of the determined RAs may include at least one tracking area (TA) associated with the UE, and each of the TAs may include at least one cell serving area (e.g., cell serving area 110A) associated with at least one RAN node (e.g., RAN node 110) corresponding to the deactivated UE. Therefore, the AMF 210 may remove and/or not include duplicate TAs and/or RAs from the MBS group paging area. For example, if the AMF 210 is associated with a first deactivated UE device and a second deactivated UE device, and the first deactivated UE device is associated with RA 10 which includes TA1, TA2, and TA3, and the second deactivated UE device is associated with RA 20 which includes TA2, TA3, and TA4, the AMF 210 may determine the MBS group paging area includes RA10 and RA20, which includes TA1, TA2, TA3, and TA4, and will not send a second (e.g., duplicate) MBS group paging message to the RAN nodes associated with TA2 and TA3, but the example embodiments are not limited thereto.

Additionally, according to at least one example embodiment, the AMF 210 may receive a plurality of AMF MBS activate messages from one or more SMFs, and the AMF MBS activate messages may be associated with the same MBS session identifier. The AMF 210 may calculate the MBS group paging area based on the RA context information for every deactivated and/or idle UE associated with the MBS session identifier.

In operation S1070A, the AMF 210 may transmit a single MBS group paging message to each of the RAN nodes (e.g., RAN node 110) included in the determined MBS group paging area. The MBS group paging message may include the group paging ID associated with the MBS session and/or the MBS session identifier, paging DRX (discontinuous reception) configuration, tracking area identifier (TAI) list, paging priority, etc., but is not limited thereto. Additionally, in operation S1070B, the RAN node 110 may transmit an activate paging message to its cell serving area in response to the MBS group paging message, the activate paging message instructing the deactivated and/or idle UE devices associated with the MBS session identifier to activate, reactivate, and/or resume the MBS session associated with the MBS session identifier. The activate paging message may include the group paging ID associated with the MBS session and/or the MBS session identifier, etc., but is not limited thereto.

Additionally, according to some example embodiments, the AMF 210 may determine whether one or more TAs and/or RAs included in the MBS group paging area previously received a MBS group paging message during a desired time period. The AMF 210 may then remove the TA and/or RA from the MBS group paging area prior to transmitting the group paging message to the RAN nodes associated with the TAs and/or RAs which did not previously receive the group paging message during the desired time period.

Further, according to some example embodiments, the AMF 210 may buffer (and/or delay transmitting) the MBS group paging message based on desired conditions. For example, the AMF 210 may determine the number of deactivated and/or idle UE devices included in the MBS group paging area and may delay the transmission of the MBS group paging message to the associated RAN nodes until the number of deactivated and/or idle UE devices meets and/or exceeds a desired threshold number of deactivated and/or idle UE devices, to reduce the number of MBS-related paging messages being transmitted over the radio network. As another example, the AMF 210 may delay the transmission of the MBS group paging message for a desired period of time so that consecutive MBS group paging messages are not transmitted over the radio network, etc.

Additionally, according to some example embodiments, the RAN node 110 may receive two or more MBS group paging messages including the same MBS session identifier and/or group paging ID from at least one AMF 210, but wherein at least some of the received MBS group paging message are associated with different MBS group paging areas, e.g., different tracking area identifier (TAI) lists. The RAN node 110 may, in the response to the reception of the two or more MBS group paging messages, determine that the MBS group paging areas at least partially overlap, e.g., at least one TAI appears in more than one TAI list of the received MBS group paging messages, and may transmit only one activate paging message (e.g., operation S1070B) in the cells serving areas where the MBS group paging areas overlap. Furthermore, the RAN node 110 may refrain from the transmission of the activate paging message (e.g., operation S1070B) in at least a portion, e.g., at least one TAI, of the MBS group paging area received in the MBS Group Paging Message (e.g., operation S1070A), if the activate paging message with the same MBS session identifier and/or group paging ID has been transmitted in the portion of the MBS group paging area, and a desired period of time since the previous transmission has not elapsed yet.

In response to the paging message, in operation S1080, each of the deactivated and/or idle UE devices, e.g., UE 120, etc., transmits service request to the AMF 210 indicating that it wants to resume the PDU session associated with the MBS service for which it has been paged. The service request includes the PDU session ID corresponding to the MBS session, the UE identifier, PDU session status, uplink data status, allowed PDU sessions status, and/or security related information, etc., but is not limited thereto, and causes the AMF 210 to transmit a Nsmf-update PDU session message to the SMF 220 in operation S1090 to request to reactivate the PDU session associated with the MBS service. In operation S1100, the SMF 220 re-activates the PDU session associated with the requesting UE device and the corresponding MSB session, and transmits a PDU session request message to the RAN node currently serving the UE 120, e.g., RAN node 110, to instruct the RAN node 110 to configure resources for the PDU session and/or the MBS session, and/or inform the RAN node of the association between the PDU session and the MBS session, etc., but is not limited thereto. The PDU session request message may include the MBS session identifier information and the multicast QOS associated with the MBS session, etc., but is not limited thereto.

In operation S1110, the RAN may transmit a configuration message to the UE device (e.g., a RRC reconfiguration message, a single-cell point-to-multipoint configuration message, etc.) to reconfigure the UE with one or more radio bearers for the reception of MBS data. In operation S1120, the RAN node 120 may transmit a PDU session response message to the SMF 220. The PDU session response message is an acknowledgement message to inform the SMF 220 about the successfully configuration of resources for the PDU session and the MBS session. In operation S1130, the MB-UPF 240 may begin transmission of buffered multicast data (e.g., MBS data, multicast messages, etc.) that it has received associated with the MBS session identifier, to the RAN nodes associated with the now-activated and connected UE devices after the expiration of a timer of a desired duration, ensuring that all desired and/or required involved RAN nodes and UE devices have been contacted. The desired duration may be based on a length time accounting for the amount of time for the network devices (e.g., SMF, AMF, MBS-SMF, MBS-UPF, etc.) and the UEs to complete the operations of S1010 to S1110, etc., but the example embodiments are not limited thereto.

In contrast to the conventional 5G protocol, the SMF-centric MBS activation group paging methods of the various example embodiments reduce the amount of radio paging messages transmitted over the air when activating an MBS session and all associated UE devices in idle mode, thereby improving the usage of radio resources. It may also reduce the network signaling messages over the NG interface (e.g., the RAN-core network interfaces 2400 and 4500, etc.). For example, some example embodiments may further improve the efficiency of the radio and network signaling message by prohibiting the transmission of duplicative MBS activation paging messages to UE devices in a RA and/or TA, etc.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A session management function (SMF) network device comprising:

a memory storing computer readable instructions; and processing circuitry configured to execute the computer readable instructions to cause the SMF network device to, receive a multicast and broadcast service (MBS) activate message, the MBS activate message including an MBS session identifier (ID), determine a plurality of deactivated user equipment (UE) devices associated with the MBS session ID, the plurality of deactivated UE devices including idle UE devices, and the plurality of deactivated UE devices determined based on packet data unit (PDU) session status information corresponding to a respective UE device stored in the memory, determine at least one access and mobility management function (AMF) network device associated with each of the determined plurality of deactivated UE devices, and transmit an AMF MBS activate message to the determined at least one AMF network device, the AMF MBS activate message including information related to at least one UE device of the plurality of deactivated UE devices associated with each of the determined at least one AMF network, the AMF MBS activate message for causing the at least one AMF network device to trigger a group paging of the at least one UE device.

2. The SMF network device of claim 1, wherein the SMF network device is further caused to:
   receive a PDU session update message from the determined at least one AMF network device corresponding to the at least one UE device; and
   transmit a PDU session request message to at least one radio access network (RAN) node associated with the at least one UE device.

3. The SMF network device of claim 1, wherein the PDU session status information corresponding to the respective UE device indicates that the PDU session associated with the received MBS session ID is deactivated.

4. The SMF network device of claim 1, wherein the AMF MBS activate message further includes at least one of the MBS session ID and a group ID indicating a paging group associated with the MBS session.

5. An access and mobility management function (AMF) network device comprising:
   a memory storing computer readable instructions; and
   processing circuitry configured to execute the computer readable instructions to cause the AMF network device to,
      receive a first AMF multicast and broadcast service (MBS) activate message from at least one session management function (SMF) network device, the first AMF MBS activate message including information related to at least one first user equipment (UE) device of a plurality of deactivated UE devices, the plurality of deactivated UE devices including idle UE devices, wherein the plurality of deactivated UE devices is determined based on packet data unit (PDU) session status information corresponding to a respective UE device stored in a memory of the SMF network device,
      determine a first MBS group paging area based on the information related to the at least one first UE device, and
      transmit a first group paging message to at least one first radio access network (RAN) node associated with the first MBS group paging area.

6. The AMF network device of claim 5, wherein the AMF network device is further caused to:
   determine the first MBS group paging area by determining at least one first registration area associated with the at least one UE device;
   determine the at least one first RAN node associated with the at least one first MBS group paging area; and
   transmit the first group paging message by transmitting the first group paging message to the determined at least one first RAN node associated with the at least one first MBS group paging area.

7. The AMF network device of claim 5, wherein the at least one first UE device is a plurality of first UE devices; and the AMF network device is further caused to:
   determine a plurality of first registration areas, each of the plurality of first registration areas associated with one of the plurality of first UE devices,
   determine the first MBS group paging area based on a combination of the determined plurality of first registrations areas,
   determine a plurality of first RAN nodes associated with the first MBS group paging area, and transmit the first group paging message to each of the determined plurality of first RAN nodes.

8. The AMF network device of claim 5, wherein the AMF network device is further caused to perform the transmitting the first group paging message at least by:
   determining a number of UE devices indicated in the first AMF MBS activate message; and
   transmitting the first group paging message in response to the number of UE devices exceeding a desired threshold number of UE devices.

9. The AMF network device of claim 5, wherein the AMF network device is further caused to perform the transmitting the first group paging message at least by:
   transmitting the first group paging message in response to an expiration of a desired length of time.

10. The AMF network device of claim 5, wherein the AMF device is further caused to:
   receive a second AMF MBS activate message from an at least one second SMF network device, the second AMF MBS activate message including information related to at least one second UE device of a plurality of second deactivated UE devices, the plurality of second deactivated UE devices including idle UE devices;
   determine a second MBS group paging area based on the information related to the at least one second UE device, the determining the second MBS group paging area including,
      determining a plurality of second registration areas associated with any one of the plurality of second deactivated UE devices, each of the plurality of second registration areas including at least one second tracking area, and
      determining the second MBS group paging area based on the determined plurality of second registration areas; and
   transmit a second group paging message to at least one second radio access network (RAN) node associated with the second MBS group paging area.

11. The AMF network device of claim 10, wherein the AMF device is further caused to:
   determine whether any second tracking area of any second registration area of the plurality of second registration areas were included in a plurality of first registration areas;
   update the second MBS group paging area by removing the second tracking areas determined to be included in the plurality of first registration areas from the second MBS group paging area; and
   transmit the second group paging message to the at least one second RAN node associated with the updated second MBS group paging area.

12. The AMF network device of claim 10, wherein the AMF device is further caused to:
   determine whether any second RAN node previously transmitted the first group paging message during a desired time period;
   update the second MBS group paging area by removing second tracking areas corresponding to the second RAN nodes determined to have previously transmitted the first group paging message from the second MBS group paging area; and
   transmit the second group paging message to the at least one second RAN node associated with the updated second MBS group paging area.

13. The AMF network device of claim 5, wherein the AMF device is further caused to:

receive a PDU session update message from the at least one first UE device in response to the first group paging message; and transmit the PDU session update message to the at least one SMF network device.

14. The AMF network device of claim 5, wherein the AMF MBS activate message further includes at least one of a MBS session ID and a group ID indicating a paging group associated with the MBS session ID.

15. The AMF network device of claim 14, wherein the group ID is included in the first or a second group paging message to the at least one RAN node associated with the MBS group paging area.

16. A method of operating a session management function (SMF) network device comprising:

receiving a multicast and broadcast service (MBS) activate message, the MBS activate message including a MBS session identifier (ID);

determining, based on packet data unit (PDU) session status information, a plurality of deactivated user equipment (UE) devices associated with the MBS session ID, the PDU session status information corresponding to a respective UE device stored in a memory;

determining at least one access and mobility management function (AMF) network device associated with each of the determined plurality of deactivated UE devices; and transmitting an AMF MBS activate message to the determined at least one AMF network device, the AMF MBS activate message including information related to at least one UE device of the plurality of deactivated UE devices associated with each of the determined at least one AMF network, the AMF MBS activate message causing the at least one AMF network device to trigger a group paging of the at least one UE device.

17. The method of claim 16, further comprising:

determining the plurality of deactivated UE devices based on MBS session status information corresponding to the respective UE devices stored in a memory of the SMF network device.

* * * * *